United States Patent [19]

Renzi et al.

[11] Patent Number: 5,173,552
[45] Date of Patent: Dec. 22, 1992

[54] PROCESS FOR THE PRODUCTION OF THERMOFORMED ARTICLES BY POLYMERIZING COMPOSITIONS COMPRISING DIETHYLENE GLYCOL BIS (ALLYLCARBONATE)

[75] Inventors: Fiorenzo Renzi, Gorgonzola; Franco Rivetti, Schio; Ugo Romano, Vimercate, all of Italy

[73] Assignee: Enichem Sintesi S.p.A., Palermo, Italy

[21] Appl. No.: 581,208

[22] Filed: Sep. 10, 1990

Related U.S. Application Data

[63] Continuation of Ser. No. 202,865, Jun. 6, 1988, abandoned, which is a continuation of Ser. No. 835,543, Mar. 3, 1986, abandoned.

[30] Foreign Application Priority Data

Mar. 29, 1985 [IT] Italy ................................ 20156 A/85

[51] Int. Cl.⁵ .......................... C08F 4/32; C08F 26/00; B29D 11/00
[52] U.S. Cl. ................ 526/230.5; 526/232.1; 526/232.2; 526/232.5; 526/232; 264/2.7; 264/322
[58] Field of Search ................ 264/2.7, 322; 526/232, 526/232.3, 230.5, 232.1, 263, 232.7

[56] References Cited

U.S. PATENT DOCUMENTS

| | | | |
|---|---|---|---|
| 3,658,801 | 4/1972 | Berry et al. | 526/261 |
| 4,373,076 | 2/1983 | Tarumi et al. | 526/261 |
| 4,521,577 | 6/1985 | Romano et al. | 526/261 |

FOREIGN PATENT DOCUMENTS 0131227 1/1985 European Pat. Off. .

Primary Examiner—Thurman K. Page
Assistant Examiner—Peter F. Kulkosky
Attorney, Agent, or Firm—Shea & Gould

[57] ABSTRACT

Optical articles are obtained by polymerizing, in the form of a flat plate, by means of a free-radical initiator, a polymerizable liquid composition containing diethylene glycol bis(allyl carbonate), tris-hydroxyethylisocyanate tris(allyl-carbonate) and vinyl acetate and/or methyl methacrylate and then submitting the so-obtained plate to thermoforming.

22 Claims, No Drawings

PROCESS FOR THE PRODUCTION OF THERMOFORMED ARTICLES BY POLYMERIZING COMPOSITIONS COMPRISING DIETHYLENE GLYCOL BIS (ALLYLCARBONATE)

CROSS REFERENCE TO RELATED CASES

This application is a continuation of Ser. No. 07/202,865 filed Jun. 6, 1988, now abandoned, which was a continuation of Ser. No. 835,543, filed Mar. 3, 1986, now abandoned.

The present invention relates to the production of thermoformed optical articles and to a polymerizable liquid composition useful to that purpose.

In the field of optical articles the products are interesting which derive from the polymerization of glycol bis(allylcarbonates) those disclosed in European Patent Application Publication. No. 35304, and among these, outstandingly interesting from the industrial viewpoint are the products of polymerization of diethylene bis(allyl carbonate), and this in view of the optical and mechanical characteristics of these particular polymerizates. More precisely, said optical articles can be obtained by submitting to polymerization a liquid composition of diethylene glycol bis (allylcarbonate), and of one or more polymerization initiators, by means of the casting technique, inside glass moulds of shape corresponding to that of the article the production of which is desired.

However, for the preparation of some optical articles it results advantageous replacing the technique of casting inside single moulds with the technique providing the production of flat plates, which are subsequently bent by thermoforming. In particular, the product outcoming from the polymerization, as a flat plate, is heated to a temperature higher than glass transition temperature and is subsequently formed inside the mould, by suitably applying a pressure or a vacuum, in correspondence of one of the major surfaces of the plate. This thermoforming technique is presently used for the production of lenses, curved screens, visors, and the like.

However, as the products of polymerization of diethylene glycol bis(allylcarbonate) are poorly thermoformable, due to their considerable crosslinking degree, in the industrial practice such diethylene glycol bis(allylcarbonate) is copolymerized with one or more monofunctional monomers, with plastifying characteristics, such as methyl methacrylate, vinyl acetate, and so forth, so as to produce polymerizates with improved thermoforming characteristics.

It has been observed however that the articles obtained by the thermoforming of said plastified polymerizates are able to maintain their shape over long time periods only it they are stored at temperatures equal to room temperatures, or slightly higher.

When on the contrary they are kept at relatively slightly increased temperatures for even short time periods (e.g., one hour at 60° C.), they sensibly loose the curvature imposed by the thermoforming, by tending to reassume their initial flat shape, and this is greatly disadvantageous. It has been found now that this drawback can be overcome, or at least considerably alleviated, when to the thermoforming polymerizates obtained starting from a particular polymerizable liquid composition are submitted.

Accordingly, the present invention relates to a process for the preparation of thermoformed optical articles, by means of the polymerization, in the form of flat plate, of a polymerizable liquid composition, followed by the thermoforming of said flat plate to give the desired optical article, said process being characterized in that the polymerizable liquid composition contains: ( (A) from 30 to 80% by weight of diethylene glycol bis(allylcarbonate);
(B) from 10 to 40% by weight of tris-hydroxyethylisocyanurate tris(allylcarbonate); and
(C) from 10 to 40% by weight of vinyl acetate or of methyl methacrylate;

the composition containing moreover at least one freeradical polymerization initiator in an amount of from 1 to 5% by weight relatively to the sum of the weights of components (A), (B) and (C).

The component (A) of the polymerizable liquid composition can be defined by the formula:

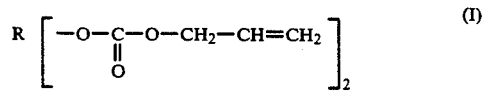

wherein R is the radical of diethylene glycol. This component can be prepared by reaction between diallylcarbonate and diethylene glycol, in a molar ratio to each other equal to or greater than 6/1, and preferably of the order of 12/1, operating in the presence of a basic catalyst, e.g., according to that disclosed in European Patent Application Publn. No. 353004.

Under these conditions, a reaction product is obtained which is constituted by at least about 70% by weight by compound (I), the residual percentage being constituted by oligomer diethylene glycol bis(allylcarbonates). Thus, the component (A) of the polymerizable liquid composition can be constituted by the compound (I) only, or by a mixture containing at least about 70% by weight of compound (I), the residual percentage being constituted by oligomers thereof.

In the preferred form of practical embodiment, the component (A) is present in the polymerizable liquid composition in amounts of from 45 to 65% by weight.

The component (B) of the polymerizable liquid composition can be defined by the general formula:

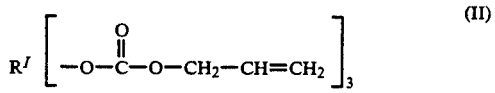

wherein $R^1$ is the radical of tris-hydroxyethylisocyanurate.

This component can be prepared by means of the reaction between diallylcarbonate and tris-hydroxyethylisocyanurate, in a molar ratio to each other equal to or higher than about 6/1 and preferably of the order of 12/1, in the presence of basic catalysts, similarly to the foregoing component (A).

Under these conditions a reaction product is obtained, is constituted by about 60% by compound (II), the residual percentage being constituted by oligomer tris-hydroxyethylisocyanurate tris(allylcarbonates). Thus, the component (B) of the polymerizable liquid composition can be constituted by the compound (II) alone, or be a mixture containing at least about 60% by weight of the compound (II), the residual percentage being constituted by oligomers thereof.

In the preferred form of practical embodiment, the component (B) is present in the polymerizable liquid composition in an amount comprised within the range of from 10 to 25% by weight.

The component (C) of the polymerizable liquid composition is constituted by vinyl acetate and/or methyl methacrylate which, in the preferred practical embodiment, are present in amounts of from 15 to 30% by weight.

The polymerizable liquid composition according to the present invention contains moreover one of more polymerization initiators, soluble in the same composition, and able to generate free radicals within a temperature range of from about 30° to about 120° C. Non-limitative examples of said initiators are diisopropylperoxydicarbonate, dicyclohexylperoxydicarbonate, di-sec.butylperoxydicarbonate, dibenzoyl-peroxide and tert.butylperbenzoate. In the preferred form of practical embodiment, the polymerization initiator is present in amounts of from 2 to 4.5% by weight, relatively to the total of the weights of components (A), (B) and (C).

The polymerizable liquid composition of the present invention can additionally contain one or more conventional additives, such as stabilizers, mould-release agents, dyes, pigments, U.V. light and I.R. light absorbers or the like, however in an overall amount not higher than 1% by weight relatively to the total of the weights of components (A), (B) and (C).

The liquid composition of the present invention is converted into the related polymerizate by heating at a temperature comprised within the range of from 30° to 120° C. The corresponding polymerization times are of the order of 3-100 hours. The polymerizates are prepared directly as flat plates, with thickness generally ranging from 1 to 4 mm, operating inside suitable moulds.

These flat plates are finally submitted to thermoforming by heating at a temperature higher than the glass transition temperature, and generally comprised within the range of from 140° to 200° C. and subsequent curvature in a mould, not heated, with the application of vacuum between the plate and the same mould.

In this way, thermoformed optical articles are obtained, such as lenses (for sunglasses or for goggles), protecting visors, visors for motorcyclist helmets and the like, provided with high thermal resistance. Moreover, said articles display a whole of optical and mechanical characteristics similar to those of the commercial articles formed by the polymerizates of diethylene glycol bis(allylcarbonate), but relatively to these latter show considerably improved characteristics of thermal resistance.

In particular, the polymerizates obtained from compositions containing components (A) and (B) only are not transformable, and those obtained from compositions containing components (B) and (C) only show a whole of optical and mechanical characteristics considerably lower than those of diethylene glycol bis(allylcarbonate) polymerizate.

By means of the liquid and polymerizable compositions of the present invention, polymerizates and related thermoformed optical articles are achieved, the whole of characteristics of which results unexpectedly good in view of the characteristics achievable when single components of the composition, or couples of the same components are used.

In the following experimental Examples, The following components have been used for the polymerizable liquid composition:

(A) Diethylene glycol bis(allylcarbonate): product from the reaction between diallylcarbonate and diethylene glycol, in the molar ratio of 12/1 to each other, operating according to that disclosed in European Patent Application publ. N. 35304; This reaction product contains 85–90% of diethylene glycol bis(allylcarbonate), the residual percentage being constituted by oligomers of the same.

(B) Tris-hydroxyethylisocyanurate tris(allylcarbonate): product from the reaction between diallylcarbonate and tris-hydroxyethylisocyanurate in the molar ratio of 12/1 to each other, obtained by operating according to the general lines of said European patent application. This reaction product contains 70–80% of tris-hydroxyethylisocyanurate tris(allylcarbonate), the residual percentage being constituted by oligomers of the same;

(C) The components (A), (B) and (C) are mixed in the suitable ratios, the polymerization initiator is then added and the so-obtained liquid compositions are poured into moulds constituted by two flat plates, with dimensions 20×20 cm, provided with a gasket of plastified polyvinyl chloride of 3.2 mm in thickness. The polymerization is carried out in forced-air circulation oven, at the temperature of 48° C. for 72 hours. At the end of this time period the plates are kept two hours at 110° C., to the purpose of destroying the possible unreacted catalyst and of eliminating inner stresses.

On so-obtained polymerizates, the following characteristics are determined:

a) Optical characteristics refractive index $n_D^{20}$, by Abbe refractometer (ASTM D-1003);

Haze (%) and visible transmittance (%), measured by Gardner Hazegard XL-211 (ASTM D-1003);

Yellow index (YI), defined as $$YI = \frac{100}{Y} (1.277 X - 1.06 Z)$$

determined by means of Gardner XL-805 colorimeter (ASTM D-1925).

b) Physical and mechanical characteristics

Density in g/ml, determined by specific-gravity balance at the temperature of 20° C. (ASTM D-792);

Rockwell (M) hardness, measured by Rockwell durometer (ASTM D-785);

Abrasion resistance, Taber method (ASTM D-1004 modified), executed with a VS-10F grinding wheels and under a load of 500 g on both wheels. The results are expressed as the ratio of the number of passages necessary to produce a Haze increase of 10% for the sample under test, to that for a reference sample (polymethylmethacrylate, PMMA);

Notch-free IZOD impact resistance (ASTM D-256 modified).

Distorsion temperature under load (HDT) (°C./1.82 MPa), (ASTM D-648).

The thermoforming is carried out on flat specimens of 75×65 of 1.4 mm in thickness, prepared from the corresponding flat plates, obtained by polymerization of the liquid compositions under the previously described conditions.

The specimens are softened at 150° C. for 2 minutes and are then bent on an aluminium mould, coated with a film of silicone rubber, with base curvature 6. This step of 2.5 minutes of duration is carried out at room temperature, by applying a vacuum between the specimen and the mould.

After this time period, the bent speciment (useful, e.g., as a neutral lens for sunglasses), now cold, is extracted from the mould, and its curvature is measured by means of a spherometer, obtaining constant values in the nearby of base 6.

The heat resistance of heat-bent specimens is evaluated by determining the decrease of their curvature after heat treatment of 1 hour at 60° C. and of 1 hour at 60° C.+1 hour at 70° C., in forced-circulation oven.

The following experimental examples are illustrative and not limitative of the scope of the invention.

EXAMPLE 1

A liquid composition (Composition I) formed by:

| A) | Diethylene glycol bis(allylcarbonate) | 57% by weight |
|---|---|---|
| B) | Tris-hydroxyethylisocyanurate tris-(allylcarbonate) | 19% by weight |
| C) | Vinyl acetate | 20% by weight |
|  | Dicyclohexylperoxydicarbonate | 4% by weight | is prepared.

To comparison purposes, a liquid composition (Composition II) formed by:

| A) | Diethylene glycol bis(allylcarbonate) | 76% by weight |
|---|---|---|
| C) | Vinyl acetate | 20% by weight |
|  | Dicyclohexylperoxydicarbonate | 4% by weight | is prepared.

The compositions I and II are submitted to polymerization, operating at the temperature of 48° C., over a time of 72 hours. The polymerizate obtained from composition I shows optical and mechanical characteristics similar to those of the polymer obtained from composition II, but has a HDT value higher by about 15° C.

Such characteristics of polymerizates are reported in Table 1.

With such polymerizatess, neutral lenses heat-bent of base 6 have been prepared, resistance is evaluated, by determining their capability to maintain the initial curvature, submitting them to the previously described heat treatments.

The results, reported in Table 2, demonstrate that the heat-bent lenses obtained by starting from the polymerizate of composition I display a heat resistance considerably higher then the heat-bent lenses obtained starting from the polymerizate of composition II.

EXAMPLE 2

The liquid compositions III and IV having the following composition, expressed as X by weight are prepared:

| COMPOSITION | | III | IV |
|---|---|---|---|
| A) | Diethylene glycol bis(allyl-carbonate) | 64.6% | 53.2% |
| B) | Tris-hydroxyethylisocyanurate tris(allylcarbonate) | 11.4% | 22.8% |
| C) | Vinyl acetate | 20.0% | 20.0% |
|  | Dicyclohexylperoxydicarbonate | 4.0% | 4.0% |

The compositions III and IV are submitted to polymerization, operating as described in Example 1, and the characteristics of the polymerizates are shown in Table 3.

With said polymerizates, lenses heat-bent to base 6 are prepared, on which the heat resistance is determined, by determining their capability to maintain the initial curvature, submitting they to the heat treatments as previously described. The results are reported in Table 4.

EXAMPLE 3

Four positions (from V to VIII) are prepared, respectively containing 15%, 20%, 25% and 30% by weight of vinyl acetate, and 4% by weight of dicyclohexylperoxydicarbonate, the residual percentage being constituted by diethylene glycol tis(allylcarbonate) and by tris-hydroxyethylisocyanurate tris(allylcarbonate) in weight ratio to each other kept constant and equal to 75/25.

In a similar way, further four compositions (from IX to XII) are prepared, respectively containing 15%, 20%, 25% and 30% by weight of vinyl acetate and 4% by of dicyclohexylperoxydicarbonate, the residual percentage being constituted by diethylene glycol bis(allylcarbonate) and by tris-hydroxyethylisocyanurate tris(allylcarbonate) in weight ratio to each other kept constant and equal to 70/30.

The compositions from V to XII are submitted to polymerization, by operating as described in example 1.

With said polymerizates, neutral lenses heat-bent to base 6 are prepared, on which the heat resistance is evaluated, by determining their capability to maintain the initial curvature, submitting them to the heat treatments as previously described. The results are reported in Table 5.

In these examples, the compositions VI and X are respectively equal to compositions I and IV, but they are reported in the present example, to the purpose of showing more clearly the influence of the concentration of vinyl acetate on the characteristics of eventually obtained articles.

TABLE 1

| Composition | I | II |
|---|---|---|
| Density (g/ml) | 1.3030 | 1.2857 |
| $n_D^{20}$ | 1.4975 | 1.4935 |
| YI | 1.6 | 0.70 |
| Haze (%) | 0.20 | 0.12 |
| Visible transmittance (%) | 93.1 | 93.4 |
| Rockwell hardness (M) | 102 | 94 |
| Modified Izod impact resistance (kI/m$^2$) | 12.7 | 13.5 |
| Taber abrasion resistance (xPMMA) | 15 | 12 |
| HDT (°C.) | 76.8 | 62.4 |

EXAMPLE 4

Three compositions (from XIII to XV) are prepared, respectively containing 15%, 20% and 25% by weight of methyl methacrylate, and 3% by weight of dicyclohexylperoxydicarbonate, the residual percentage being constituted by diethylene glycol bis(allylcarbonate) and by tris-hydroxyethylisocyanurate tris(allylcarbonate) in weight ratio to each other kept constant and equal to 75/25.

Said compositions are submitted to polymerization, by operating as described in example 1.

With said polymerizates, neutral lenses heat-bent to base 6 are prepared, on which the heat resistance is evaluated, determining their capability to maintain the initial curvature, submitting them to the heat treatments as previously described. The results are reported in Table 6.

TABLE 2

| Composition | I | II |
|---|---|---|
| Initial curvature (base) | 6 | 6 |
| Curvature after 1 hour at 60° C. | 5.5 | 4.25 |
| Curvature after 1 hour at 60° C. + 1 hour at 70° C. | 4.75 | 1.0 |

TABLE 3

| Composition | III | IV |
|---|---|---|
| Density (g/ml) | 1.2977 | 1.3054 |
| $n_D^{20}$ | 1.4959 | 1.4983 |
| YI | 1.39 | 2.07 |
| Haze (%) | 0.43 | 0.23 |
| Visible transmittance (%) | 93.0 | 92.9 |
| Rockwell hardness (M) | 99 | 103 |
| Modified Izod impact resistance (kl/m$^2$) | 11.9 | 10.4 |
| Taber abrasion resistance (xPMMA) | 15 | 18 |
| HDT (°C.) | 71.9 | 79.9 |

TABLE 4

| Composition | III | IV |
|---|---|---|
| Initial curvature (base) | 6 | 6 |
| Curvature after 1 hour at 60° C. | 5.25 | 5.5–5.75 |
| Curvature after 1 hour at 60° C. + 1 hour at 70° C. | 4.25 | 5–5.25 |

TABLE 5

| Composition | Initial Curvature (base) | Curvature after 1 hour at 60° C. | Curvature after 1 hour at 60° C. + 1 hour at 70° C. |
|---|---|---|---|
| V | 6 | 5.5–5.75 | 5 |
| VI | 6 | 5.5 | 4.75 |
| VII | 6 | 5.5 | 4.5–4.75 |
| VIII | 6 | 5.25–5.5 | 3.75–4 |
| IX | 6 | 5.5–5.75 | 5–5.25 |
| X | 6 | 5.5–5.75 | 5–5.25 |
| XI | 6 | 5.5–5.75 | 4.75–5 |
| XII | 6 | 5.5 | 4.5 |

TABLE 6

| Composition | XIII | XIV | XV |
|---|---|---|---|
| Initial curvature (base) | 6 | 6 | 6 |
| Curvature after 1 hour at 60° C. | 5.5 | 5.5–5.75 | 5.5–5.75 |
| Curvature after 1 hour at 60° C. + 1 hour at 70° C. | 4.75 | 5 | 5 |

We claim:

1. A process for the preparation of a non-planar thermoformed optical article from a flat plate formed from a polymerizable liquid composition, said non-planar thermoformed optical article having improved resistance to curvature loss at elevated temperatures as compared to the same composition having a lower monomeric content and to returning to the shape of the flat plate, said process comprising:

(1) polymerizing a liquid composition in a mold capable of forming a flat plate, said liquid composition comprising;
      (A) from 30 to 80% by weight of diethylene glycol bis (allylcarbonate) prepared by reaction between diallylcarbonate and diethylene glycol in a molar ratio to each other at least 6/1, wherein said diethylene glycol bis (allylcarbonate) is 85 to 90% by weight monomeric,
      (B) from 10 to 40% by weight of the trishydroxyethylisocyanurate tris (allylcarbonate) resulting from the reaction between diallylcarbonate and tris-hydroxyethylisocyanurate in a molar ratio of from about 6/1 to about 12/1,
      (C) from 10 to 40% by weight of vinyl acetate, wherein the monomers of (A), (B) and (C) are substantially the only monomers present in the liquid composition and from 1 to 5% by weight based on the total weight of components (A), (B), and (C) of at least one free radical polymerization initiator, at a temperature of from 30° to 120° C. to thereby form a flat plate of said polymerized composition;
   (2) heating said flat plate to a temperature of at least the glass transition temperature of the polymerized composition; and
   (3) heating said flat plate into said non-planar thermoformed optical article.

2. The process of claim 1 wherein the molar ratio between said diallylcarbonate and diethylene glycol is about 12/1 and said diethylene glycol bis(allylcarbonate) is 85–90% by weight monomeric.

3. The process of claim 1 wherein said step of thermoforming said heated flat plate comprises positioning said heated flat plate in a mold and applying at least a partial vacuum between the heated plate and the mold.

4. The process of claim 3 wherein the step of forming said heated flat plate is conducted in the absence of heat.

5. The process of claim 1 wherein the polymerizable liquid composition comprises:
   (A) from 45 to 65% by weight of diethylene glycol bis (allylcarbonate) prepared by reaction between diallylcarbonate and diethylene glycol in a molar ratio to each other of at least 6/1, wherein said diethylene glycol bis (allylcarbonate) is 85 to 90% by weight monomeric;
   (B) from 10 to 25% by weight of trishydroxyethylisocyanurate tris (allylcarbonate) resulting from the reaction between diallylcarbonate and tris-hydroxyethylisocyanurate in a molar ratio of from about 6/1 to about 12/1;
   (C) from 15 to 30% by weight of vinyl acetate; and from 2.0 to 4.5% by weight based on the total weight of components (A), (B) and (C) of at least one free radical polymerization initiator.

6. The process of claim 5 wherein the molar ratio between said diallylcarbonate and diethylene glycol is about 12/1 and said diethylene glycol bis(allylcarbonate) is 85–90% by weight monomeric.

7. The process of claim 1 wherein the polymerizable liquid composition further comprises at least one component selected from stabilizers, mold-release agents, dyes, pigments, ultraviolet absorbers and infrared absorbers in an amount of up to 1.0% by weight based on the total weight of components (A), (B) and (C).

8. The process of claim 1 wherein the step of polymerizing the polymerizable liquid composition is conducted for 3 to 100 hours.

9. The process of claim 1 wherein the thickness of the flat plates is from 1 to 4 mm.

10. The process of claim 1 wherein the step of heating the flat plate is conducted at a temperature of from 140° to 200° C.

11. The process of claim 1 wherein the free radical polymerization initiator is selected from diisopropylperoxydicarbonate, dicyclohexylperoxydicarbonate, di-sec.butyl-peroxydicarbonate, dibenzoylperoxide and tert.butylperbenzoate.

12. The process of claim 1 wherein component (B) is the reaction product of diallylcarbonate and tris-hydroxyethylisocyanurate in a molar ratio of at least 6:1, said reaction product containing at least about 60% by weight of tri-hydroxyethylisocyanurate tris(allylcarbonate).

13. A process for the preparation of a non-planar thermoformed optical article from a flat plate formed from a polymerizable liquid composition, said non-planar thermoformed optical article having improved resistance to curvature loss at elevated temperatures as compared to the same composition having a lower monomeric content and to returning to the shape of the flat plate, said process comprising:
(1) polymerizing a liquid composition in a mold capable of forming a flat plate, said liquid composition comprising;
(A) from 45 to 65% by weight of diethylene glycol bis (allylcarbonate) prepared by reaction between diallylcarbonate and diethylene glycol in a molar ratio to each other of at least 6/1, wherein said diethylene glycol bis (allylcarbonate) is 85 to 90% by weight monomeric,
(B) from 10 to 25 % by weight of trishydroxyethylisocyanurate tris (allylcarbonate) resulting from the reaction between diallylcarbonate and tris-hydroxyethylisocyanurate in a molar ratio of from about 6/1 to about 12/1,
(C) from 15 to 30% by weight of vinyl acetate, wherein the monomers of (A), (B) and (C) are substantially the only monomers present in the liquid composition and from 2.0 to 4.5% by weight based on the total weight of components (A), (B), and (C) of at least one free radical polymerization initiator, at a temperature of from 30° to 120° C. for 3 to 100 hours to thereby form a flat plate of said polymerized composition having a thickness of 1 to 4 mm;
(2) heating said flat plate to a temperature of from 140° to 200° C.; and
(3) thermoforming said flat plate by positioning the heated flat plate in a mold and applying at least a partial vacuum between the heat flat plate and the mold to thereby form said non-planar thermoformed optical article.

14. The process of claim 13 wherein the molar ratio between said diallylcarbonate and diethylene glycol is about 12/1 and said diethylene glycol bis(allylcarbonate) is 85–90% by weight monomeric.

15. The process of claim 13 wherein the polymerizable liquid composition further comprises at least one component selected from stabilizers, moldrelease agents, dyes, pigments, ultraviolet absorbers and infrared absorbers in an amount of up to 1.0% by weight based on the total weight of components (A), (B) and (C).

16. The process of claim 13 wherein the free radical polymerization initiator is selected from diisopropylperoxydicarbonate, dicyclohexylperoxydicarbonate, di-sec.butyl-peroxydicarbonate, dibenzoylperoxide and tert.butylperbenzoate.

17. A thermoformed optical article produced by the process of claim 1.

18. A thermoformed optical article produced by the process of claim 13.

19. A polymerizable liquid composition having improved resistance to curvature loss at elevated temperature as compared to the same composition having a lower monomeric content comprising:
(A) from 30 to 80% by weight of diethylene glycol bis (allylcarbonate) prepared by reaction between diallylcarbonate and diethylene glycol in a molar ratio to each other of at least 6/1, wherein said diethylene glycol bis (allylcarbonate) is 85 to 90% by weight monomeric;
(B) from 10 to 40% by weight of trishydroxyethylisocyanurate tris (allylcarbonate) resulting from the reaction between diallylcarbonate and tris-hydroxyethylisocyanurate in a molar ratio of from about 6/1 to about 12/1,
(C) from 10 to 40% by weight of vinyl acetate, wherein the monomers of (A), (B) and (C) are substantially the only monomers present in the liquid composition; and
from 1 to 5% by weight based on the total weight of components (A), (B), and (C) of at least one free radical polymerization initiator.

20. The process of claim 19 wherein the molar ratio between said diallylcarbonate and diethylene glycol is about 12/1 and said diethylene glycol bis(allylcarbonate) is 85–90% by weight monomeric.

21. The polymerizable liquid composition of claim 19 comprising:
(A) from 45 to 65% by weight of diethylene glycol bis(allylcarbonate) prepared by reaction between diallylcarbonate and diethylene glycol in a molar ratio to each other of at least 6/1, wherein said diethylene glycol bis(allylcarbonate) is at least 70% by weight monomeric;
(B) from 10 to 25% by weight of trishydroxyethylisocyanurate tris(allylcarbonate);
(C) from 15 to 30% by weight of vinyl acetate or methyl methacrylate; and
from 2.0 to 4.5% by weight based on the total weight of components (A), (B) and (C) of at least one free radical polymerization initiator.

22. The process of claim 21 wherein the molar ratio between said diallylcarbonate and diethylene glycol is about 12/1 and said diethylene glycol bis(allylcarbonate) is 85–90% by weight monomeric.

* * * * *

UNITED STATES PATENT AND TRADEMARK OFFICE
CERTIFICATE OF CORRECTION

PATENT NO. : 5,173,552

DATED : December 22, 1992

INVENTOR(S) : Fiorenzo Renzi et al.

It is certified that error appears in the above-identified patent and that said Letters Patent is hereby corrected as shown below:

IN THE CLAIMS:

In Claim 1, in line 15, after the word "other" and before the word "at", insert --of--;

In Claim 1, in lines 18-19, the word "trishydroxyethylisocyanurate" should read as --tris-hydroxyethylisocyanurate--;

In Claim 5, in lines 9-10, the word "trishydroxyethylisocyanurate" should read as --tris-hydroxyethylisocyanurate--;

In Claim 12, in line 5, the word "trihydroxyethylisocyanurate" should read as --tris-hydroxyethylisocyanurate--;

In Claim 13, in lines 18-19, the word "trishydroxyethylisocyanurate" should read as --tris-hydroxyethylisocyanurate--;

In Claim 15, in line 3, "moldrelease" should read as --mold release--;

In Claim 19, in lines 11-12, the word "trishydroxyethylisocyanurate" should read as --tris-hydroxyethylisocyanurate--; and

UNITED STATES PATENT AND TRADEMARK OFFICE
CERTIFICATE OF CORRECTION

PATENT NO. : 5,173,552
DATED : December 22, 1992
INVENTOR(S) : Fiorenzo Renzi et al.

It is certified that error appears in the above-indentified patent and that said Letters Patent is hereby corrected as shown below:

In claim 30, lines 11-12, "or methyl methacrylate" should be deleted.

Signed and Sealed this

Second Day of November, 1993

*Attest:*

BRUCE LEHMAN

*Attesting Officer*  *Commissioner of Patents and Trademarks*